(12) United States Patent
Weiner et al.

(10) Patent No.: US 11,591,155 B2
(45) Date of Patent: Feb. 28, 2023

(54) STAND UP DEVICE

(71) Applicant: Florence Weiner Revocable Living Trust, as amended, Miami, FL (US)

(72) Inventors: Florence Weiner, Miami, FL (US); Richard Holtzman, Allentown, PA (US)

(*) Notice: Subject to any disclaimer, the term of this patent is extended or adjusted under 35 U.S.C. 154(b) by 0 days.

(21) Appl. No.: 17/504,458

(22) Filed: Oct. 18, 2021

(65) Prior Publication Data

US 2022/0117814 A1 Apr. 21, 2022

Related U.S. Application Data

(60) Provisional application No. 63/093,296, filed on Oct. 18, 2020.

(51) Int. Cl.
| | | |
|---|---|---|
| *A61G 7/053* | (2006.01) | |
| *B65D 83/04* | (2006.01) | |
| *A61J 1/03* | (2006.01) | |
| *A61H 3/04* | (2006.01) | |
| *B62B 9/20* | (2006.01) | |

(52) U.S. Cl.
CPC ........... *B65D 83/04* (2013.01); *A61G 7/0533* (2013.01); *A61H 3/04* (2013.01); *A61J 1/03* (2013.01); *B62B 9/20* (2013.01); *A61G 2200/32* (2013.01); *A61H 2201/0157* (2013.01); *A61H 2201/0161* (2013.01); *A61H 2201/0192* (2013.01); *A61H 2201/1638* (2013.01)

(58) Field of Classification Search
CPC .. A61G 7/0516; A61G 7/0518; A61G 7/0533; A61G 5/14
See application file for complete search history.

(56) References Cited

U.S. PATENT DOCUMENTS

| | | | | |
|---|---|---|---|---|
| 5,568,662 A | * | 10/1996 | Gougelet | A61G 1/01 5/628 |
| 7,568,249 B1 | * | 8/2009 | Kunde | A61G 7/052 5/424 |
| 2021/0369523 A1 | * | 12/2021 | Kousik | A61G 7/0533 |

FOREIGN PATENT DOCUMENTS

| | | | | |
|---|---|---|---|---|
| GB | 2519406 B | * | 6/2016 | A47C 21/08 |
| GB | 2538953 A | * | 12/2016 | A61B 5/00 |

* cited by examiner

*Primary Examiner* — David R Hare
*Assistant Examiner* — Adam C Ortiz

(57) ABSTRACT

In accordance with one or more embodiments of the invention, a stand up device is presented, including a substantially ring-shaped grip portion, a height adjustment tube, a frame, a securing mechanism, and a plurality of legs. The stand up device provides additional support when installed with a mattress, and facilitates getting up from, and standing up from, a bed.

10 Claims, 3 Drawing Sheets

STAND UP DEVICE

CROSS-REFERENCE TO RELATED APPLICATIONS

This application claims the benefit of U.S. Provisional Application No. 63/093,296, filed Oct. 18, 2020. The contents of the above-identified application are incorporated by reference in their entirety as if recited in full herein.

BACKGROUND OF THE INVENTION

Field of Invention

The inventions disclosed herein generally relate to devices that facilitate standing up from a bed. More particularly, the inventions relate to devices that can be removably attached to almost any bed, that require no tool assembly, and that help users to sit up in a bed and to stand up from the bed. The invention may include a handle that swivels, further facilitating sitting up in bed and standing up from bed. This may be especially helpful for people with limited mobility or dexterity, often related to disabilities or age related challenges.

Description of Related Art

Many beds can be difficult for people with limited mobility or dexterity, including related to disabilities or age. Sitting up in bed can be very difficult, as can standing up out of bed. Mattresses don't typically provide much help for getting up, and there's often nothing to grab on to, in order to provide assistance sitting up or standing up. The acts of sitting up in bed, or standing up from bed, can require great physical or dexterity-related demands.

BRIEF SUMMARY OF EMBODIMENTS OF THE INVENTION

Aspects of the inventions include a removably securable stand up device, comprising: a substantially ring-shaped grip portion, the grip portion capable of swiveling; a height adjustment tube, the height adjustment tube having an attachment mechanism to the grip portion; a frame, the frame accepting insertion of the height adjustment tube; a securing mechanism to secure the height adjustment tube to the frame; and a plurality of legs, the legs being removably attachable to the frame, the legs capable of rotating relative to the frame; where the plurality of legs provide support to the stand up device from a mattress on top of the plurality of legs.

Aspects may also include where the ring shaped grip portion has a plurality of indentations along an inner surface.

Aspects may also include where the securing mechanism to secure the height adjustment tube to the frame comprises a thumb nut and bolt.

Aspects may also include where the legs may be removably attached to the frame portion via screws.

Aspects may also include where the screws comprise thumb screws.

Aspects may also include where the legs are capable of being positioned approximately perpendicular the frame.

Aspects may also include where at least a portion of the device has glow in the dark capability.

Aspects may also include where the substantially ring shaped grip portion has an outer diameter of approximately seven inches.

Aspects may also include where the legs have a length of approximately one foot.

Aspects may also include where the height adjustment tube has a plurality of holes along its length, for engagement with a securing mechanism.

BRIEF DESCRIPTION OF THE DRAWINGS

For a more complete understanding of various embodiments of the present invention, reference is now made to the following descriptions taken in connection with the accompanying drawings in which.

DETAILED DESCRIPTION OF EMBODIMENTS OF THE INVENTION

Figure 1:
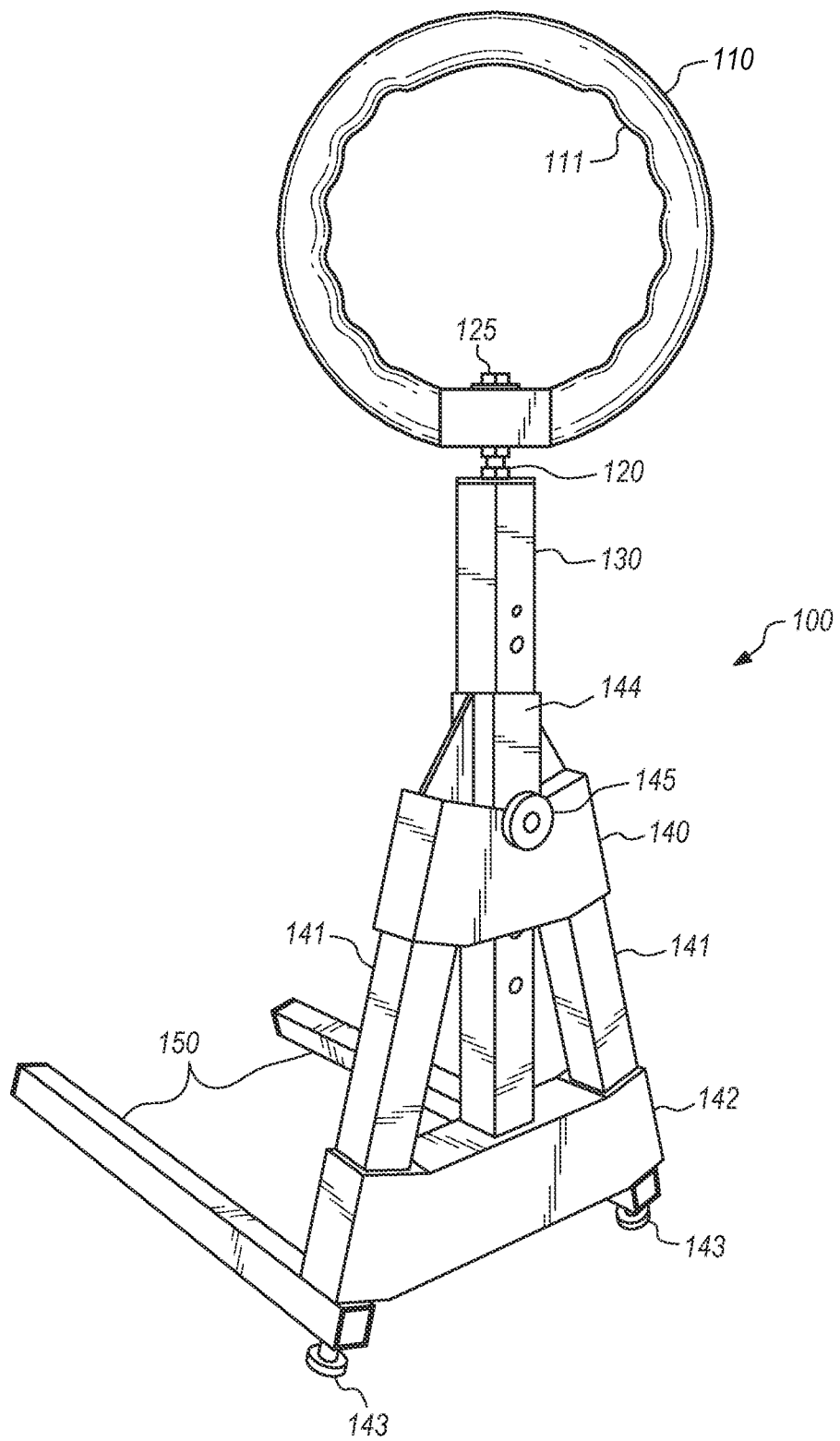
FIG. 1 illustrates an exemplary stand up device.

FIG. 1 illustrates exemplary stand up device 100, including ring-shaped grip portion 110, with indentations 111 along an inner surface, bolt 125, swivel mechanism 120, and height adjustment tube 130. FIG. 1 illustrates frame 140, with frame portion 144 for accepting insertion of height adjustment tube 130. Also illustrated is thumb nut 145, for tightening height adjustment tube 130 to frame 140. Also illustrated are frame leg portions 141, connecting to lower frame portion 142. Legs 150 are illustrated, as attached to lower frame portion 142 via thumb screws 143. As illustrated in FIG. 1, swivel mechanism 120 may rely on bolt 125. As illustrated in FIG. 1, legs 150 may be arranged substantially perpendicularly to frame 140. A part of ring-shaped grip portion 110 may have glow in the dark capability.

Figure 2:
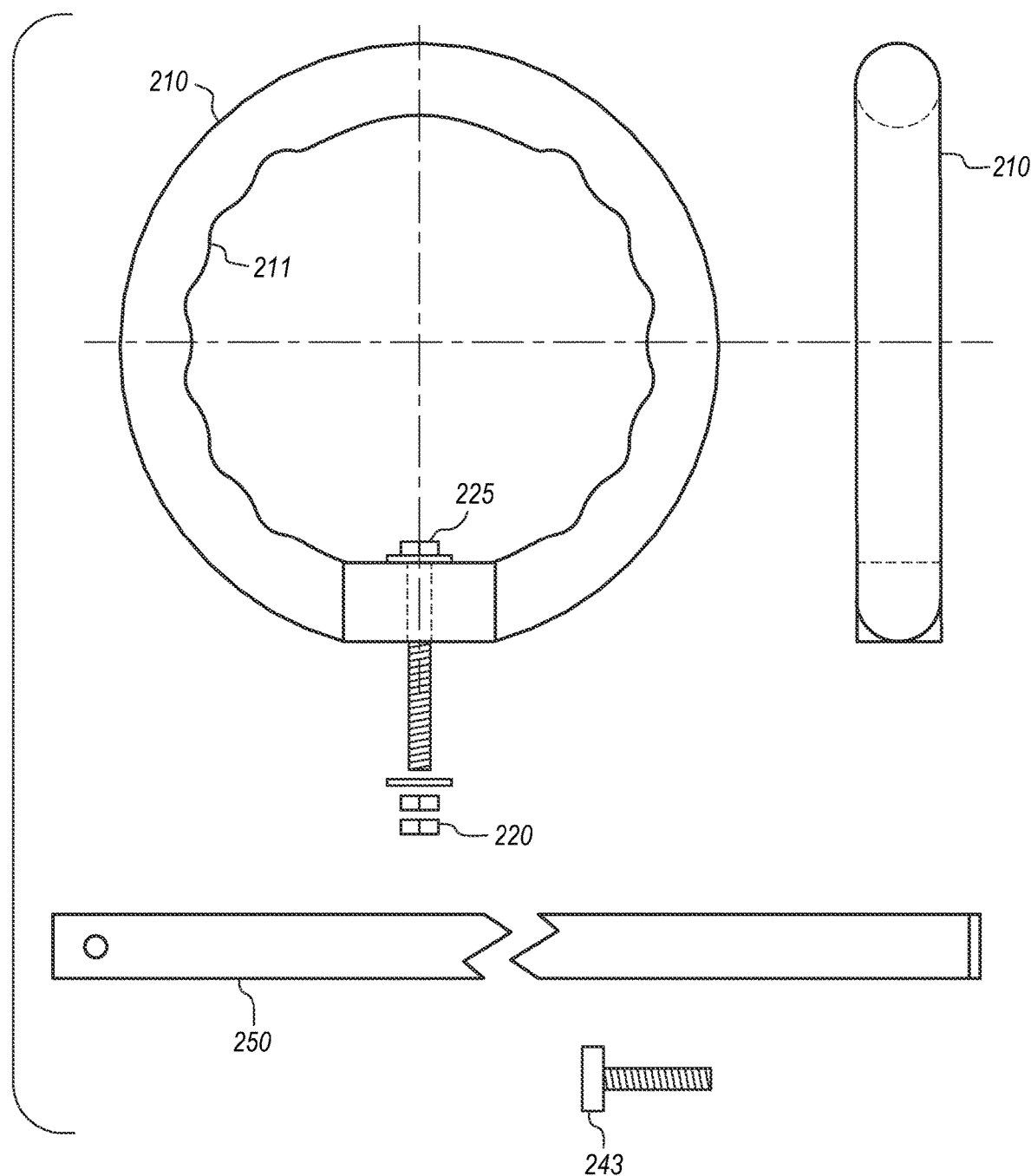
FIG. 2 illustrates a side view of portions of an exemplary stand up device.

FIG. 2 illustrates a side view of portions of an exemplary stand up device. Ring-shaped grip portion 210 is illustrated, with indentations 211. Bolt 225 is illustrated, along with swivel mechanism 220. Cutaway portions of leg 250 are illustrated, along with thumb screw 243.

Figure 3:
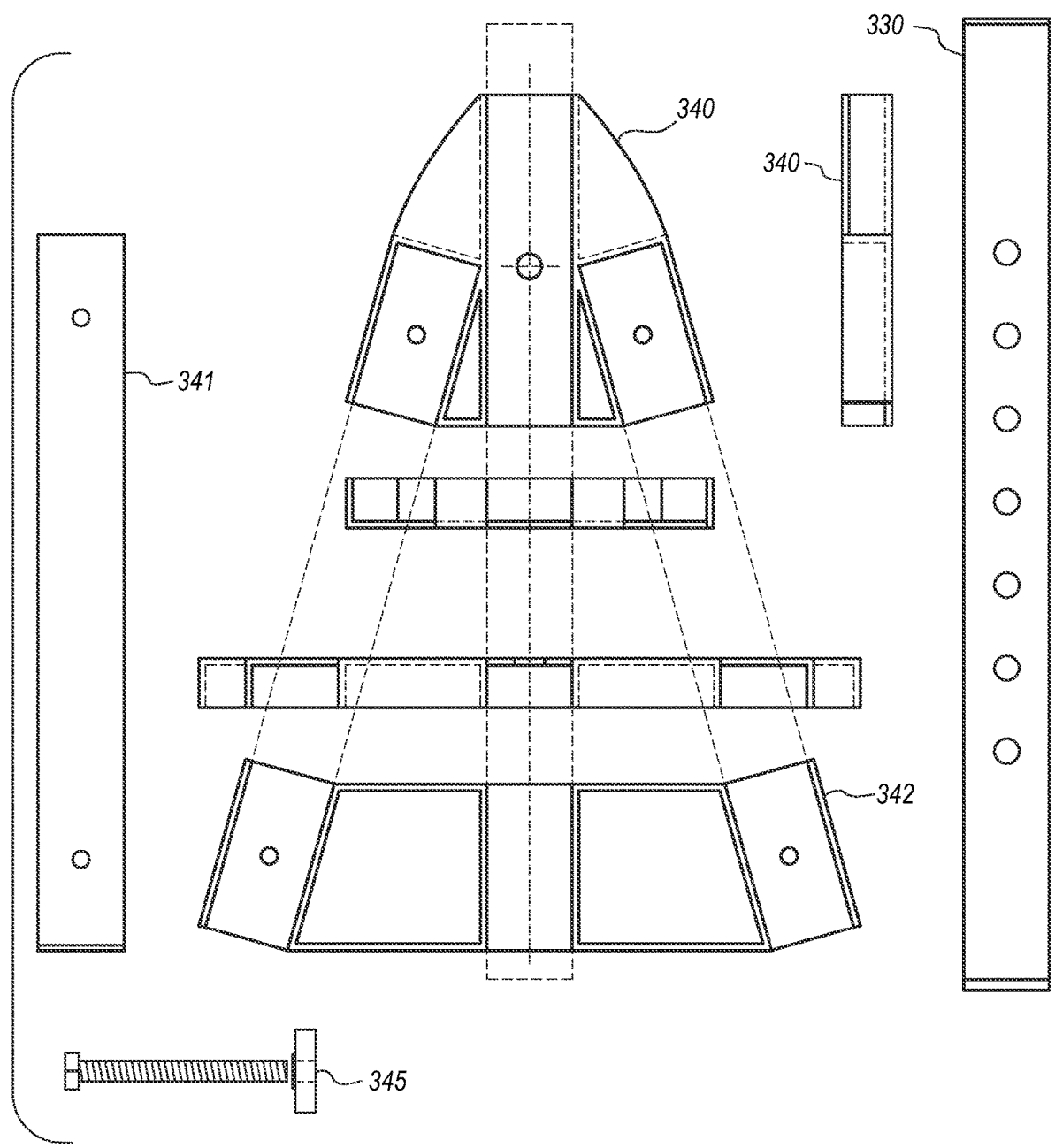
FIG. 3 illustrates a side view of portions of an exemplary stand up device.

FIG. 3 illustrates a side view of portions of an exemplary stand up device. Frame 340 is illustrated, including lower frame portion 342, frame leg portion 341, height adjustment tube 330, illustrated with holes along its length, and thumb nut 345 with its mated bolt.

Assembly: Legs of the stand up device may be attached to the device using thumb screws into the bottom of the frame. Legs may be positioned approximately perpendicular to the frame, or at other angles.

Installation After a stand up device is assembled, with the legs attached, it may be installed, by inserting the legs under a mattress, and sliding the stand up device towards the side of the mattress. The legs may be inserted under a mattress, and for example above a box spring or foundation. The mattress on top of the legs provides support for the stand up device. At least a portion of the ring-shaped grip portion of the stand up device preferably extends above a top surface of an engaged mattress, and even more preferably the entire ring-shaped grip portion may extend above a top surface of an engaged mattress.

Adjustment Stand up devices are preferably height adjustable. The height of the ring-shaped grip portion of the stand up device may be adjusted by the following exemplary steps: remove the thumb nut and bolt; adjust the ring to a desired height, lining up a hole in the frame with a hole in the height adjustment tube; and insert the bolt though the holes and re-attach the thumb nut. The height adjustment tube may have a number of holes for adjustment; the height adjustment tube may have seven holes for adjustment, or may have more or fewer.

As will be realized, the systems and methods disclosed herein are capable of other and different embodiments and its several details may be capable of modifications in various respects, all without departing from the invention as set out in the appended claims. Accordingly, the drawings and description are to be regarded as illustrative in nature and not in a restrictive or limiting sense with the scope of the application being indicated in the claims.

What is claimed is:

1. A removably securable stand up device, comprising:
   a substantially ring-shaped grip portion, the grip portion capable of swiveling;
   a height adjustment tube, the height adjustment tube having an attachment mechanism to the grip portion;
   a frame, the frame accepting insertion of the height adjustment tube;
   a securing mechanism to secure the height adjustment tube to the frame; and
   a plurality of legs, the legs being removably attachable to the frame, the legs capable of rotating relative to the frame while being engaged with the frame, the legs capable of rotating independently of one another;
   where the plurality of legs are configured to be inserted underneath a mattress to provide support to the stand up device.

2. The stand up device of claim 1, where the ring shaped grip portion has a plurality of indentations along an inner surface.

3. The stand up device of claim 1, where the securing mechanism to secure the height adjustment tube to the frame comprises a thumb nut and bolt.

4. The stand up device of claim 1, where the legs may be removably attached to the frame portion via screws.

5. The stand up device of claim 4, where the screws comprise thumb screws.

6. The stand up device of claim 1, where the legs are capable of being positioned approximately perpendicular the frame or at multiple other angles.

7. The stand up device of claim 1, where at least a portion of the device has glow in the dark capability.

8. The stand up device of claim 1, where the substantially ring shaped grip portion has an outer diameter of approximately seven inches.

9. The stand up device of claim 1, where the legs have a length of approximately one foot.

10. The stand up device of claim 1, where the height adjustment tube has a plurality of holes along its length, for engagement with a securing mechanism.

* * * * *